(12) United States Patent
Hoshiba et al.

(10) Patent No.: US 7,832,510 B2
(45) Date of Patent: Nov. 16, 2010

(54) POWER OUTPUT APPARATUS FOR HYBRID VEHICLE

(75) Inventors: Takeshi Hoshiba, Toyota (JP); Mitsuhiro Nada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1061 days.

(21) Appl. No.: 10/563,136

(22) PCT Filed: Jun. 15, 2004

(86) PCT No.: PCT/JP2004/008694
§ 371 (c)(1), (2), (4) Date: Jan. 3, 2006

(87) PCT Pub. No.: WO2005/007440
PCT Pub. Date: Jan. 27, 2005

(65) Prior Publication Data
US 2006/0162972 A1   Jul. 27, 2006

(30) Foreign Application Priority Data
Jul. 22, 2003 (JP) ............................. 2003-200030

(51) Int. Cl.
*B60W 10/06* (2006.01)
*B60W 10/08* (2006.01)
(52) U.S. Cl. .................... 180/65.265; 180/65.6; 701/22
(58) Field of Classification Search ............ 180/65.235, 180/65.265, 65.28, 65.285, 65.29, 65.6; 903/915, 903/923, 941, 942, 945; 701/22; 318/8, 318/9, 34, 51, 52
See application file for complete search history.

(56) References Cited

U.S. PATENT DOCUMENTS 5,804,947 A    9/1998   Nii et al.

(Continued)

FOREIGN PATENT DOCUMENTS

DE          198 03 160 C1     5/1999

(Continued)

OTHER PUBLICATIONS

Japanese Language Version of Japanese Office Action for Appln. No. JP 2003-200030 issued Jun. 6, 2006.

(Continued)

*Primary Examiner*—J. Allen Shriver, II
*Assistant Examiner*—John D Walters
(74) *Attorney, Agent, or Firm*—Kenyon & Kenyon LLP

(57) ABSTRACT

A hybrid vehicle of the invention has an engine, a planetary gear unit including a carrier linked with rankshaft of the engine and a ring gear linked with a drive shaft, a motor MG1 inputting and outputting power to and from a sun gear of the planetary gear unit, and a motor MG2 inputting and outputting power to and from the drive shaft. During a drive of the hybrid vehicle in a light load state and under a drive restriction of the motor MG2, the hybrid vehicle corrects a target revolution speed Ne* of the engine to make a calculated average charge-discharge electric power Wbave of a battery equal to a charge-discharge electric power demand Wb*, while keeping a torque of the engine unchanged (steps S300 to S330), and controls actuation of the engine and the motors MG1 and MG2.

8 Claims, 10 Drawing Sheets

U.S. PATENT DOCUMENTS

| | | | |
|---|---|---|---|
| 5,907,191 A | 5/1999 | Sasaki et al. | |
| 5,936,312 A | 8/1999 | Koide et al. | |
| 6,087,734 A | 7/2000 | Maeda et al. | |
| 6,356,817 B1 * | 3/2002 | Abe | 701/22 |
| 6,470,983 B1 | 10/2002 | Amano et al. | |
| 6,590,299 B2 * | 7/2003 | Kuang et al. | 290/40 C |
| 6,664,751 B1 * | 12/2003 | Gabriel et al. | 318/599 |
| 7,000,718 B2 * | 2/2006 | Adachi et al. | 180/65.235 |
| 7,055,636 B2 * | 6/2006 | Komiyama et al. | 180/65.23 |
| 2001/0017227 A1 * | 8/2001 | Amano et al. | 180/65.2 |
| 2002/0062183 A1 * | 5/2002 | Yamaguchi et al. | 701/22 |

FOREIGN PATENT DOCUMENTS

| | | |
|---|---|---|
| DE | 100 24 235 A1 | 12/2000 |
| EP | 0 820 894 | 1/1998 |
| EP | 0 903 259 A2 | 3/1999 |
| EP | 0 943 475 A2 | 9/1999 |
| EP | 1 092 581 A2 | 4/2001 |
| JP | 10-268946 | 10/1998 |
| JP | 11-055810 | 2/1999 |
| JP | 2000-087785 | 3/2000 |
| JP | 2000-333304 | 11/2000 |

OTHER PUBLICATIONS

Japanese Language Translation of Japanese Office Action for Appln. No. JP 2003-200030 issued Jun. 6, 2006.

* cited by examiner

POWER OUTPUT APPARATUS FOR HYBRID VEHICLE

FIELD OF THE INVENTION

The present invention relates to a power output apparatus, an automobile, and methods of controlling the same.

BACKGROUND OF THE INVENTION

A proposed power output apparatus has an internal combustion engine, a planetary gear unit that includes a carrier linked with an output shaft of the internal combustion engine and a ring gear linked with a drive shaft, a generator that inputs and outputs power to and from a sun gear of the planetary gear unit, and a motor that inputs and outputs power to and from the drive shaft (see, for example, Japanese Patent Laid-Open Gazette No. H11-55810). In the case of heat generation in the generator or its driving circuit, this prior art apparatus decreases the output torque of the internal combustion engine and raises the revolution speed of the internal combustion engine, so as to reduce the load of the generator and prevent the heat generation in the generator while maintaining a power demand to be output from the internal combustion engine.

In the power output apparatus that independently drives the internal combustion engine and the drive shaft, in the case of the occurrence of some disturbance like overheat of the generator, the drive point of the internal combustion engine is changed to respond to the disturbance while keeping the power demand to be output from the internal combustion engine unchanged. Keeping the power demand to be output from the internal combustion engine unchanged maintains the driving force to be output to the drive shaft. When the motor that outputs power to the drive shaft is under a drive restriction due to heat generation in the motor or its driving circuit, however, the technique of keeping the power demand to be output from the internal combustion engine unchanged may make the output from the internal combustion engine significantly greater than the output to the drive shaft and may cause an accumulator like a secondary battery to be excessively charged.

SUMMARY OF THE INVENTION

The power output apparatus, the automobile, and their control methods of the invention aim to prevent an accumulator like a secondary battery from being excessively charged under a drive restriction of a motor that is capable of outputting power to a drive shaft. The power output apparatus, the automobile, and their control methods of the invention also aim to ensure output of a power in the range of the drive restriction to the drive shaft under the drive restriction of the motor. The power output apparatus, the automobile, and their control methods of the invention further aim to improve the emission under the drive restriction of the motor.

In order to attain at least part of the above aims, the power output apparatus, the automobile, and their control methods are constructed as follows.

A first power output apparatus of the present invention is an apparatus that outputs power to a drive shaft, the power output apparatus including: an internal combustion engine; an electric power-mechanical power input-output module that is linked with an output shaft of the internal combustion engine and with the drive shaft and outputs at least part of power from the internal combustion engine to the drive shaft through inputs and outputs of electric power and mechanical power; a motor that is capable of inputting and outputting power from and to the drive shaft; an accumulator that is capable of supplying and receiving electric power to and from the electric power-mechanical power input-output module and the motor; a power demand setting module that sets a power demand required to the drive shaft, in response to an operator's manipulation; a target power setting module that sets a target power to be output from the internal combustion engine, based on the setting of the power demand; a drive restriction effectuation module that, when a predetermined restricting condition is fulfilled, effects a drive restriction of the motor based on the predetermined restricting condition; a correction module that corrects the setting of the target power based on the effected drive restriction, when the drive restriction of the motor is effected by the drive restriction effectuation module; and a control module that executes normal control of controlling the internal combustion engine, the electric power-mechanical power input-output module, and the motor in the case of no effectuation of the drive restriction of the motor by the drive restriction effectuation module to ensure output of the target power from the internal combustion engine and output of a power corresponding to the setting of the power demand to the drive shaft, the control module executing restriction control of controlling the internal combustion engine, the electric power-mechanical power input-output module, and the motor in the case of effectuation of the drive restriction of the motor by the drive restriction effectuation module to ensure output of the corrected target power from the internal combustion engine and output of a power in a range of the effected drive restriction from the motor.

Under no drive restriction of the motor, the first power output apparatus of the invention controls the internal combustion engine, the electric power-mechanical power input-output module, and the motor to ensure output of the target power from the internal combustion engine and output of a power corresponding to the power demand to the drive shaft. Under the drive restriction of the motor, on the other hand, the first power output apparatus corrects the target power based on the drive restriction and controls the internal combustion engine, the electric power-mechanical power input-output module, and the motor to ensure output of the corrected target power from the internal combustion engine and output of a power in the drive restriction from the motor. Namely, the target power is corrected to change the drive point of the internal combustion engine under the drive restriction of the motor. The arrangement of the invention effectively prevents the accumulator from being excessively charged and ensures output of the power in the range of the drive restriction to the drive shaft. This desirably prevents deterioration of the emission by output of a power corresponding to the power demand from the internal combustion engine under the drive restriction of the motor.

In one preferable embodiment of the invention, the first power output apparatus further includes a charge-discharge electric power measurement module that measures a charge-discharge electric power used to charge the accumulator or obtained by discharging the accumulator; and an electric power demand setting module that sets an electric power demand for charging or discharging the accumulator, based on a predetermined charge-discharge condition. The correction module corrects the target power to cancel a difference between the charge-discharge electric power measured by the charge-discharge electric power measurement module and the electric power demand set by the electric power demand setting module. The electric power used to charge the accumulator or obtained by discharging the accumulator thus significantly approaches to the electric power demand. This arrangement effectively prevents the accumulator from being excessively charged.

In one preferable application of the first power output apparatus of the invention, the target power setting module specifies a target torque and a target revolution speed to set the target power, and the correction module varies the specified target revolution speed to correct the target power. The drive point of the internal combustion engine is thus changed, while the torque output from the internal combustion engine is kept unchanged. This arrangement desirably reduces the effects of a varying output of the power to the drive shaft by the electric power-mechanical power input-output module with a variation in target power.

In another preferable application of the first power output apparatus of the invention, the control module executes the restriction control on a condition that the power demand is in a predetermined light load power range, when the drive restriction of the motor is effected by the drive restriction effectuation module. Such control is restrictively executed in a light load state, while different control is adopted in a heavy load state. This arrangement ensures adequate control in response to the operator's requirement.

A second power output apparatus of the present invention is an apparatus that outputs power to a drive shaft, the power output apparatus including: an internal combustion engine; an electric power-mechanical power input-output module that is linked with an output shaft of the internal combustion engine and with the drive shaft and outputs at least part of power from the internal combustion engine to the drive shaft through inputs and outputs of electric power and mechanical power; a motor that is capable of inputting and outputting power from and to the drive shaft; an accumulator that is capable of supplying and receiving electric power to and from the electric power-mechanical power input-output module and the motor; and a control module that sets a power demand required to the drive shaft in response to an operator's manipulation and sets a target power to be output from the internal combustion engine based on the setting of the power demand, the control module controlling the internal combustion engine, the electric power-mechanical power input-output module, and the motor in the case of no fulfillment of a predetermined restricting condition to ensure output of the target power from the internal combustion engine and output of a power corresponding to the power demand to the drive shaft, in the case of fulfillment of the predetermined restricting condition, the control module effecting a drive restriction of the motor based on the predetermined restricting condition, correcting the setting of the target power based on the effected drive restriction, and controlling the internal combustion engine, the electric power-mechanical power input-output module, and the motor to ensure output of the corrected target power from the internal combustion engine and output of a power in a range of the effected drive restriction from the motor.

Under no drive restriction of the motor, the second power output apparatus of the invention controls the internal combustion engine, the electric power-mechanical power input-output module, and the motor to ensure output of the target power from the internal combustion engine and output of a power corresponding to the power demand to the drive shaft. Under the drive restriction of the motor, on the other hand, the second power output apparatus corrects the target power based on the drive restriction and controls the internal combustion engine, the electric power-mechanical power input-output module, and the motor to ensure output of the corrected target power from the internal combustion engine and output of a power in the drive restriction from the motor. Namely, the target power is corrected to change the drive point of the internal combustion engine under the drive restriction of the motor. The arrangement of the invention effectively prevents the accumulator from being excessively charged and ensures output of the power in the range of the drive restriction to the drive shaft. This desirably prevents deterioration of the emission by output of a power corresponding to the power demand from the internal combustion engine under the drive restriction of the motor.

In the first or the second power output apparatus discussed above, the electric power-mechanical power input-output module may include: a three-shaft power input-output assembly that is connected with three shafts, that is, the output shaft of the internal combustion engine, the drive shaft, and a third shaft, and specifies input and output of power from and to one residual shaft among the three shafts, based on powers input and output from and to two shafts among the three shafts; and a generator that inputs and outputs power from and to the third shaft. In the first or the second power output apparatus discussed above, the electric power-mechanical power input-output module may include a pair-rotor generator having a first rotor, which is linked with the output shaft of the internal combustion engine, and a second rotor, which is linked with the drive shaft and rotates relative to the first rotor, the pair-rotor generator outputting at least part of the power from the internal combustion engine to the drive shaft through input and output of electric power by electromagnetic interaction between the first rotor and the second rotor.

The power output apparatus of any application mentioned above may be mounted on an automobile. Specifically, an automobile of the present invention includes: an internal combustion engine; an electric power-mechanical power input-output module that is linked with an output shaft of the internal combustion engine and with a drive shaft coupled with an axle and outputs at least part of power from the internal combustion engine to the drive shaft through inputs and outputs of electric power and mechanical power; a motor that is capable of inputting and outputting power from and to the drive shaft; an accumulator that is capable of supplying and receiving electric power to and from the electric power-mechanical power input-output module and the motor; a power demand setting module that sets a power demand required to the drive shaft, in response to an operator's manipulation; a target power setting module that sets a target power to be output from the internal combustion engine, based on the setting of the power demand; a drive restriction effectuation module that, when a predetermined restricting condition is fulfilled, effects a drive restriction of the motor based on the predetermined restricting condition; a correction module that corrects the setting of the target power based on the effected drive restriction, when the drive restriction of the motor is effected by the drive restriction effectuation module; and a control module that executes normal control of controlling the internal combustion engine, the electric power-mechanical power input-output module, and the motor in the case of no effectuation of the drive restriction of the motor by the drive restriction effectuation module to ensure output of the target power from the internal combustion engine and output of a power corresponding to the setting of the power demand to the drive shaft, the control module executing restriction control of controlling the internal combustion engine, the electric power-mechanical power input-output module, and the motor in the case of effectuation of the drive restriction of the motor by the drive restriction effectuation module to ensure output of the corrected target power from the internal combustion engine and output of a power in a range of the effected drive restriction from the motor. Another automobile of the present invention includes: an internal combustion engine; an electric power-mechanical power input-output module that is linked with an output shaft of the internal combustion engine and with the drive shaft coupled with an axle and outputs at least part of power from the internal combustion engine to the drive shaft through inputs and outputs of electric power and mechanical power; a motor that is capable of inputting and outputting power from and to the drive shaft; an accumulator that is capable of supplying and receiving electric power to and from the electric power-mechanical power input-output module and the motor; and a control module that sets a power demand required to the drive shaft in response to an operator's manipulation and sets a target power to be output from the internal combustion engine based on the setting of the power demand, the control module controlling the internal combustion engine, the electric power-mechanical power input-output module, and the motor in the case of no fulfillment of a predetermined restricting condition to ensure output of the target power from the internal combustion engine and output of a power corresponding to the power demand to the drive shaft, in the case of fulfillment of the predetermined restricting condition, the control module effecting a drive restriction of the motor based on the predetermined restricting condition, correcting the setting of the target power based on the effected drive restriction, and controlling the internal combustion engine, the electric power-mechanical power input-output module, and the motor to ensure output of the corrected target power from the internal combustion engine and output of a power in a range of the effected drive restriction from the motor.

In one preferable embodiment of the invention, one of the automobiles discussed above further includes: a charge-discharge electric power measurement module that measures a charge-discharge electric power used to charge the accumulator or obtained by discharging the accumulator; and an electric power demand setting module that sets an electric power demand for charging or discharging the accumulator, based on a predetermined charge-discharge condition. The correction module corrects the setting of the target power to cancel a difference between the charge-discharge electric power measured by the charge-discharge electric power measurement module and the electric power demand set by the electric power demand setting module. In one preferable application of the automobiles discussed above, the target power setting module specifies a target torque and a target revolution speed to set the target power, and the correction module may vary the specified target revolution speed to correct the target power. In another preferable application of the automobile discussed above, the control module executes the restriction control on a condition that the power demand is in a predetermined light load power range, when the drive restriction of the motor is effected by the drive restriction effectuation module.

The technique of the power output apparatus and the automobile with the power output apparatus mounted thereon of the present invention is also applicable to a control method for a power output apparatus or for an automobile. A control method of the present invention is a method for a power output apparatus or an automobile, that includes: an internal combustion engine; an electric power-mechanical power input-output module that is linked with an output shaft of the internal combustion engine and with a drive shaft and outputs at least part of power from the internal combustion engine to the drive shaft through inputs and outputs of electric power and mechanical power; a motor that is capable of inputting and outputting power to and from the drive shaft; and an accumulator that is capable of supplying and receiving electric power to and from the electric power-mechanical power input-output module and the motor, the control method including the steps of: (a) setting a power demand required to the drive shaft, in response to an operator's manipulation; (b) setting a target power to be output from the internal combustion engine, based on the setting of the power demand; (c) when a predetermined restricting condition is fulfilled, effecting a drive restriction of the motor based on the predetermined restricting condition; (d) correcting the setting of the target power based on the effected drive restriction, in the case of effectuation of the drive restriction of the motor; and (e) controlling the internal combustion engine, the electric power-mechanical power input-output module, and the motor in the case of no effectuation of the drive restriction of the motor to ensure output of the target power from the internal combustion engine and output of a power corresponding to the setting of the power demand to the drive shaft, while controlling the internal combustion engine, the electric power-mechanical power input-output module, and the motor in the case of effectuation of the drive restriction of the motor to ensure output of the corrected target power from the internal combustion engine and output of a power in a range of the effected drive restriction from the motor.

In one preferable embodiment of the invention, the control method further includes, prior to the step (d), the steps of: (f) measuring a charge-discharge electric power used to charge the accumulator or obtained by discharging the accumulator; and (g) setting an electric power demand for charging or discharging the accumulator, based on a predetermined charge-discharge condition. The step (d) corrects the target power to cancel a difference between the observed charge-discharge electric power and the setting of the electric power demand.

DETAILED DESCRIPTION

Figure 1:
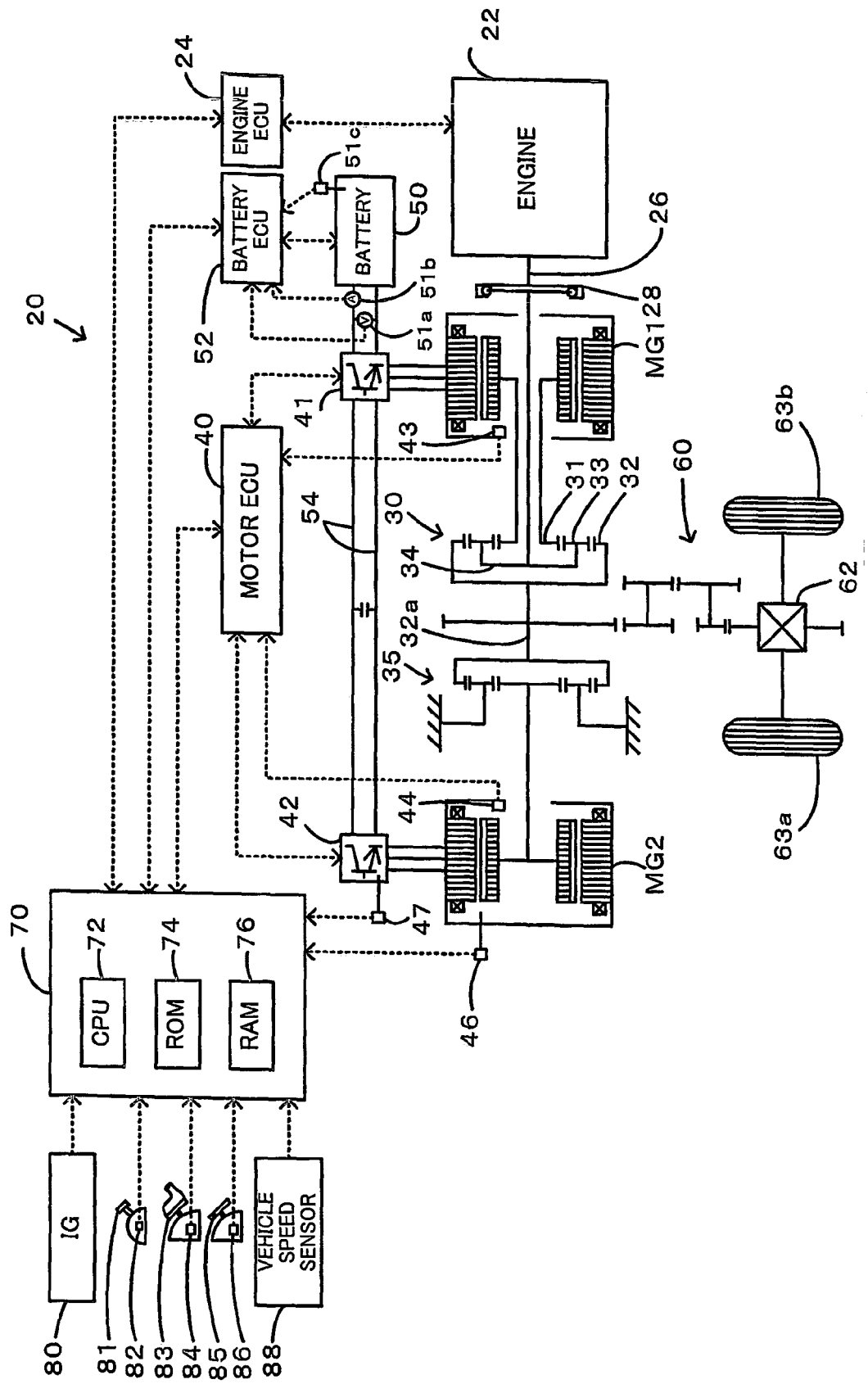
FIG. 1 schematically illustrates the construction of a hybrid vehicle 20 in one embodiment of the invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that consumes a hydrocarbon fuel, such as gasoline or light oil, to output power and is under control of an engine electronic control unit (hereafter referred to as engine ECU) 24. The engine ECU 24 receives input signals from various sensors detecting the driving conditions of the engine 22 and carries out operation control including fuel injection control, ignition control, and intake air flow regulation. The engine ECU 24 communicates with the hybrid electronic control unit 70 and receives control signals from the hybrid electronic control unit 70 to control the operations of the engine 22, while outputting data regarding the driving conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via the ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is finally transmitted to the driving wheels 63a, 63b via the gear mechanism 60 and differential gear 62 from ring gear shaft 32a.

Both of the motors MG1 and MG2 are constructed as known synchronous generator motors, which are driven as an electric generator as well as an electric motor. The motors MG1 and MG2 transmit electric power from and to a battery 50 via inverters 41 and 42. A power line 54 connecting the inverters 41 and 42 with the battery 50 includes a positive terminal bus line and a negative terminal bus line shared by the two inverters 41 and 42. This arrangement enables the electric power generated by one of the motors MG1 and MG2 to be consumed by the other motor. The battery 50 is charged with the excess electric power of the motor MG1 or the motor MG2 and is discharged to supplement the insufficient electric power of the motor MG1 or the motor MG2. The battery 50 is neither charged not discharged when there is an electric power balance by the motors MG1 and MG2. The motors MG1 and MG2 are both driven and controlled by a motor electronic control unit (hereinafter referred to as motor ECU) 40. The motor ECU 40 receives signals required for driving and controlling the motors MG1 and MG2, for example, signals from rotational position detection sensors 43 and 44 that detect the rotational positions of rotors in the motors MG1 and MG2 and values of phase electric currents supplied to the motors MG1 and MG2 and detected by non-illustrated electric current sensors. The motor ECU 40 outputs switching control signals to the inverters 41 and 42. The motor ECU 40 communicates with the hybrid electronic control unit 70 and drives and controls the motors MG1 and MG2 in response to control signals from the hybrid electronic control unit 70 while outputting data regarding the driving conditions of the motors MG1 and MG2 to the hybrid electronic control unit 70 according to the requirements.

The battery 50 is controlled by a battery electronic control unit (hereinafter referred to as battery ECU) 52. The battery ECU 52 receives signals required for controlling the battery 50, for example, a value of inter-terminal voltage Vb measured by a voltage sensor 51a disposed between terminals of the battery 50, a value of charge discharge electric current Ib measured by an electric current sensor 51b attached to the power line 54 connecting with an output terminal of the battery 50, and a battery temperature Tb measured by a temperature sensor 51c attached to the battery 50. The battery ECU 52 outputs data regarding the conditions of the battery 50 to the hybrid electronic control unit 70 via communication according to the requirements. The battery ECU 52 computes a state of charge (SOC) from an accumulated value of the charge discharge electric current Ib measured by the electric current sensor 51b for controlling the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: a motor temperature Tm from a temperature sensor 46 attached to the motor MG2, an inverter temperature Tinv from a temperature sensor 47 attached to the inverter 42, an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a required torque, which is to be output to the ring gear shaft 32a or the drive shaft, based on the accelerator opening Acc corresponding to the driver's step-on amount of the accelerator pedal 83 and the vehicle speed V. The engine 22 and the motors MG1 and MG2 are under operation control to enable power corresponding to the calculated required torque to be actually output to the ring gear shaft 32a. The operation control of the engine 22 and the motors MG1 and MG2 has multiple modes, a torque conversion drive mode, a charge-discharge drive mode, and a motor drive mode. In the torque conversion drive mode, the engine 22 is under operation control to output a power equivalent to the required power. The motors MG1 and MG2 are driven and controlled to cause the total power output from the engine 22 to be subjected to the torque conversion by means of the power distribution and integration mechanism 30 and the motors MG1 and MG2 and to be output to the ring gear shaft 32a. In the charge-discharge drive mode, the engine 22 is under operation control to output a power equivalent to the sum of the required power and an electric power used for charging and discharging the battery 50. The motors MG1 and MG2 are driven and controlled to cause all or part of the power output from the engine 22 with a charge or a discharge of the battery 50 to be subjected to the torque conversion by means of the power distribution and integration mechanism 30 and the motors MG1 and MG2 and to be output as the required power to the ring gear shaft 32a. In the motor drive mode, the operation of the engine 22 is at a stop, while the motor MG2 is driven and controlled to output a power equivalent to the required power to the ring gear shaft 32a.

Figure 2:
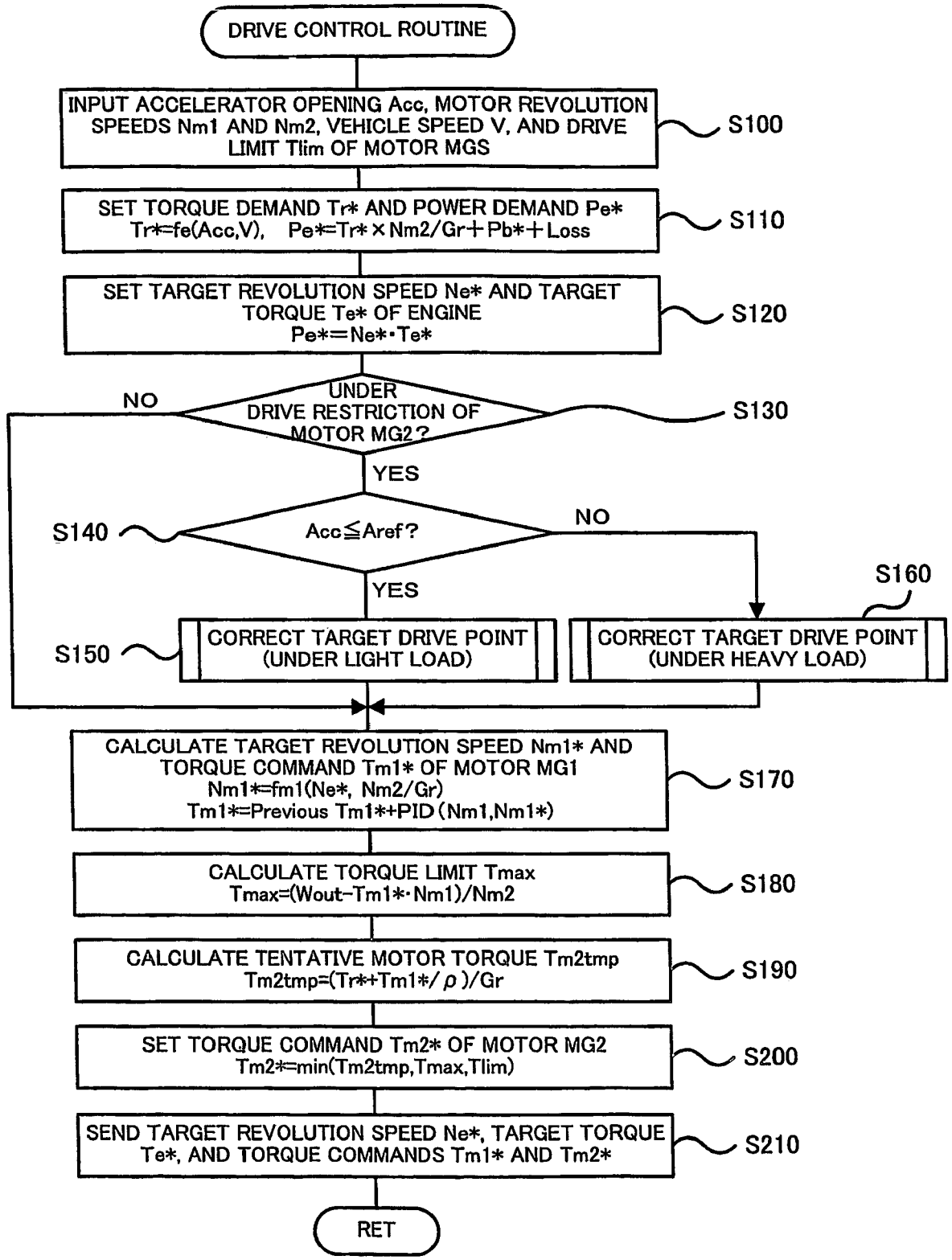
FIG. 2 is a flowchart showing a drive control routine executed by a hybrid electronic control unit 70.

The following describes the operations of the hybrid vehicle 20 of the embodiment constructed as discussed above, especially the operation under a drive restriction of the motor MG2 due to a temperature rise of the motor MG2 or the inverter 42. FIG. 2 is a flowchart showing a drive control routine executed by the hybrid electronic control unit 70. This routine is carried out repeatedly at preset time intervals (for example, at every 8 msec).

When the drive control routine starts, the CPU 72 of the hybrid electronic control unit 70 first inputs various data required for control, that is, the accelerator opening Acc from the accelerator pedal position sensor 84, the vehicle speed V from the vehicle speed sensor 88, revolution speeds Nm1 and Nm2 of the motors MG1 and MG2, and a drive limit Tlim of the motor MG2 (step S100). The procedure of this embodiment receives the revolution speeds Nm1 and Nm2 of the motors MG1 and MG2, which have been calculated according to rotational positions of rotors in the motors MG1 and MG2 detected by rotational position detection sensors 43 and 44, from the motor ECU 40 via communication. The procedure of this embodiment reads out and inputs the drive limit Tlim of the motor MG2, which has been set according to a non-illustrated drive limit setting routine based on the motor temperature Tm from the temperature sensor 46 attached to the motor MG2, the inverter temperature Tinv from the temperature sensor 47 attached to the inverter 42, and the revolution speed Nm2 of the motor MG2 and has been written at a specified address in the RAM 76. The drive limit Tlim is set, for example, as a value of 60% or 50% of a rated maximum torque of the motor MG2 at the revolution speed Nm2, when the motor temperature Tm or the inverter temperature Tinv is not lower than an upper limit motor temperature or an upper limit inverter temperature set as the upper threshold to ensure continuous actuation of the motor MG2. In this embodiment, when the motor temperature Tm or the inverter temperature Tinv is lower than the upper limit motor temperature or the upper limit inverter temperature, a rated maximum torque of the motor MG2 at a revolution speed Ne is set to the drive limit Tlim. For the better understanding of explanation, the following description first regards the procedure without a drive restriction of the motor MG2 and the procedure under a drive restriction of the motor MG2.

Figure 3:
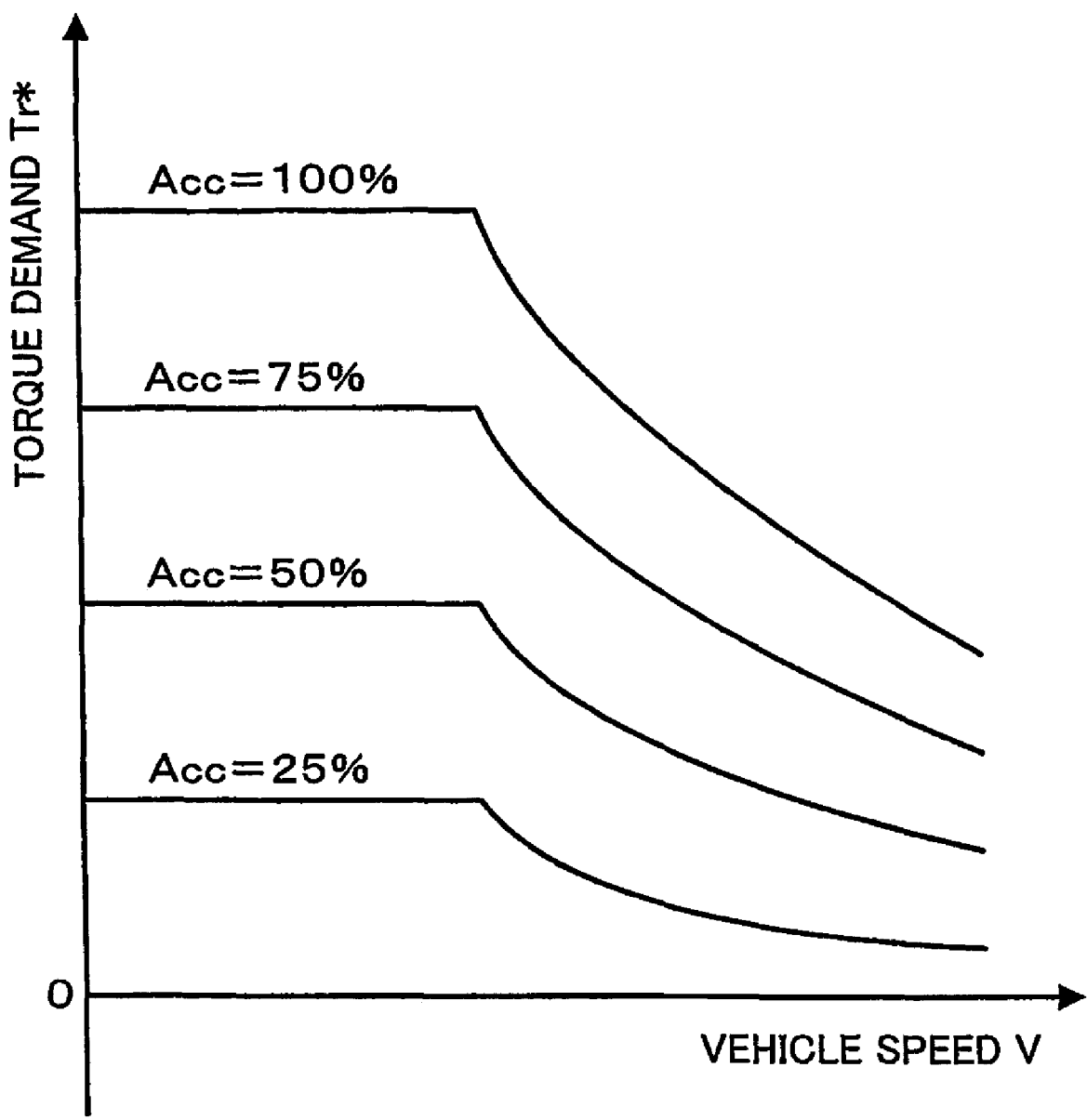
FIG. 3 shows an example of a torque demand setting map.

After the input of these data, the CPU 72 sets a torque demand Tr* to be output to the ring gear shaft 32a or the drive shaft linked with the drive wheels 63a and 63b as the torque required for the vehicle and a power demand Pe* to be output from the engine 22, based on the inputs of the accelerator opening Acc and the vehicle speed V (step S110). In the structure of this embodiment, variations in torque demand Tr* against the accelerator opening Acc and the vehicle speed V are specified in advance and stored as a torque demand setting map in the ROM 74. The procedure of the embodiment reads and sets the torque demand Tr* corresponding to the given accelerator opening Acc and the given vehicle speed V from the stored torque demand setting map. FIG. 3 shows an example of the torque demand setting map. The power demand Pe* is calculated as the sum of the product of the setting of the torque demand Tr* and a revolution speed Nr of the ring gear shaft 32a, a charge-discharge power demand Pb* of the battery 50, and a potential loss 'Loss'. The revolution speed Nr of the ring gear shaft 32a may be obtained by multiplying the vehicle speed V by a conversion coefficient k or by dividing the revolution speed Nm2 of the motor MG2 by a gear ratio Gr of the reduction gear 35.

Figure 4:
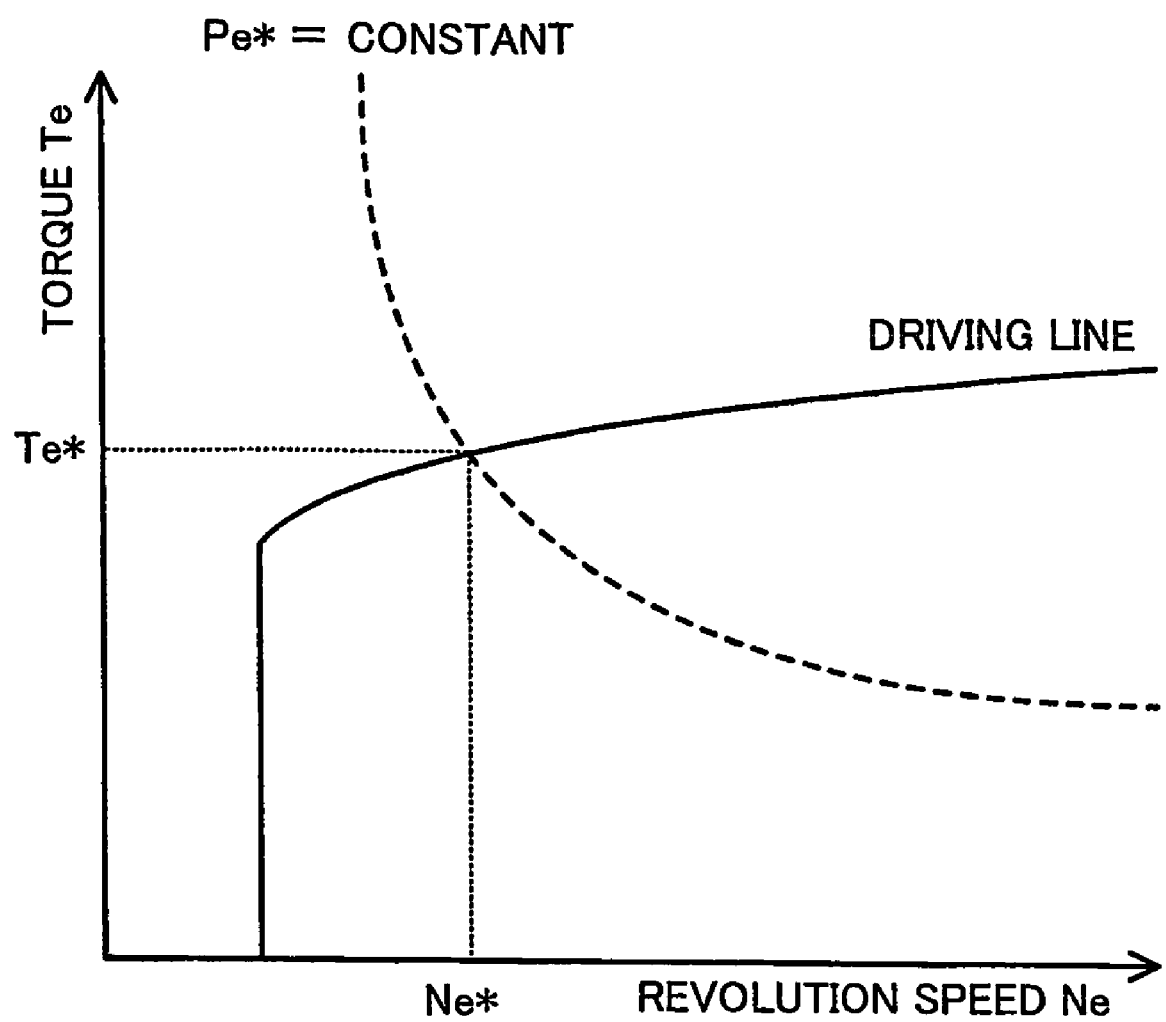
FIG. 4 shows an example of a driving line of an engine 22 and a process of setting a target revolution speed Ne* and a target torque Te*.

After setting the torque demand Tr* and the power demand Pe*, a target revolution speed Ne* and a target torque Te* of the engine 22 are set according to the setting of the power demand Pe* (step S120). Here the target revolution speed Ne* and the target torque Te* are set according to a driving line for efficiently driving the engine 22 and the setting of the power demand Pe*. An example of the driving line of the engine 22 and the process of setting the target revolution speed Ne* and the target torque Te* are shown in FIG. 4. As illustrated, the target revolution speed Ne* and the target torque Te* are obtained as the intersection of the driving line and a curve of constant power demand Pe* (=Ne*Te*).

After setting the target revolution speed Ne* and the target torque Te*, it is determined whether the motor MG2 is under a drive restriction (step S130). The presence of the drive restriction of the motor MG2 may be specified according to the value of the drive limit Tlim or according to the value of a flag, which may be set to effect the drive restriction of the motor MG2.

Figure 5:
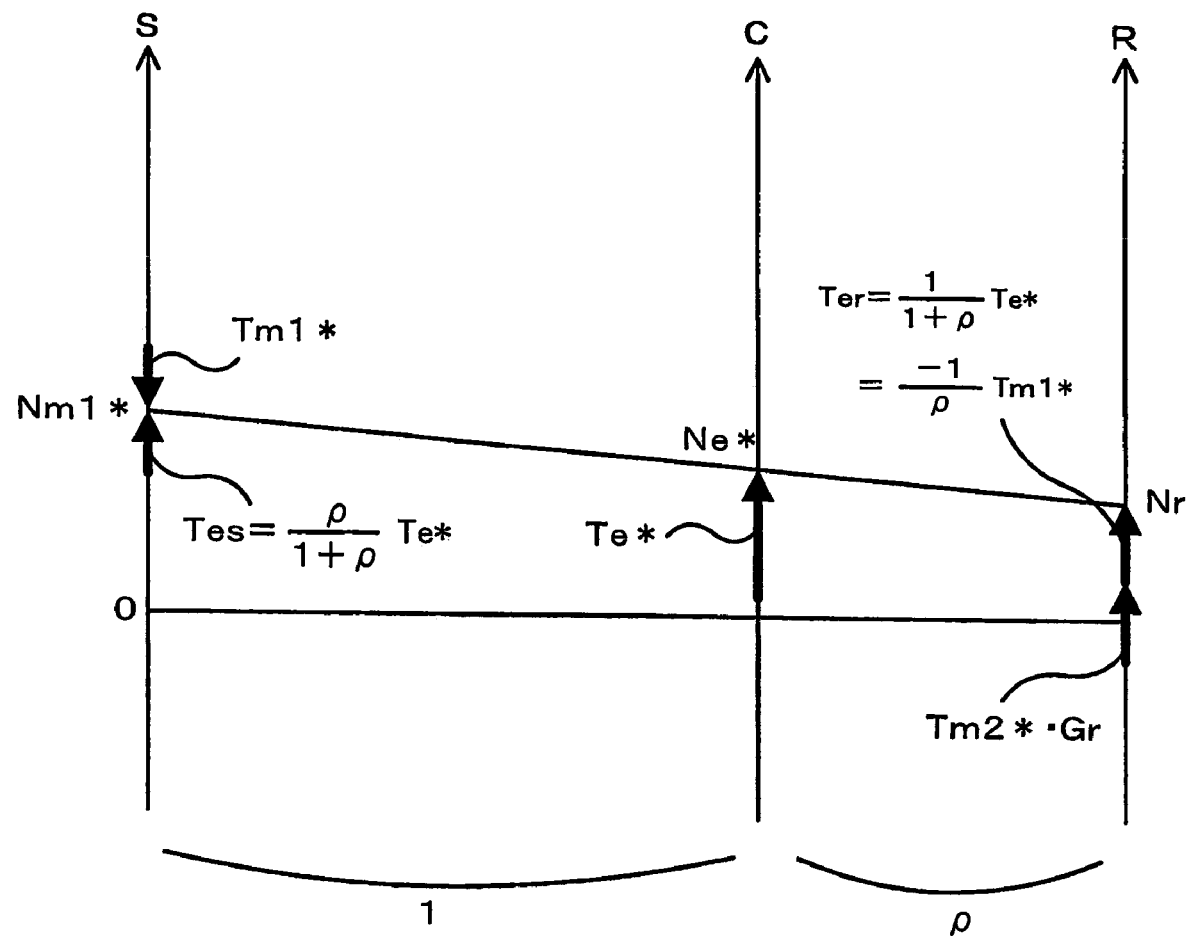
FIG. 5 is an alignment chart showing a dynamic relation with respect to a rotational elements in a power distribution integration mechanism 30.

The description first regards the case without a drive restriction of the motor MG2. The routine thus gives a negative answer in this cycle at step S130 and goes to the processing of and after step S170. The CPU 72 calculates a target revolution speed Nm1* of the motor MG1 from the setting of the target revolution speed Ne*, the revolution speed Nr (=Nm2/Gr) of the ring gear shaft 32a, and a gear ratio of the power distribution integration mechanism 30 according to Equation (1) given below, while calculating a torque command Tm1* of the motor MG1 from the calculated target revolution speed Nm1* and the current revolution speed Nm1 according to Equation (2) given below (step S170). Equation (1) shows a dynamic relation of the rotational elements in the power distribution integration mechanism 30. FIG. 5 is an alignment chart showing a dynamic relation between the revolution speed and the torque with respect to the rotational elements in the power distribution integration mechanism 30. An axis S shows the revolution speed of the sun gear 31 that is equal to the revolution speed Nm1 of the motor MG1. An axis C shows the revolution speed of the carrier 34 that is equal to the revolution speed Ne of the engine 22. An axis R shows the revolution speed Nr of the ring gear 32 that is obtained by multiplying the revolution speed Nm2 of the motor MG2 by the gear ratio Gr of the reduction gear 35. Equation (1) is easily derived from this alignment chart. Two thick arrows on the axis R respectively represent a torque acting on the ring gear shaft 32a as a torque Te* output from the engine 22 is transmitted via the power distribution integration mechanism 30 while the engine 22 is steadily driven at a specific drive point defined by the target torque Te* and the target revolution speed Ne*, and a torque acting on the ring gear shaft 32a as a torque Tm2* output from the motor MG2 is transmitted via the reduction gear 35. Equation (2) shows a relation in feedback control to rotate the motor MG1 at the target revolution speed Nm1*. In Equation (2), 'k1' in the second term on the right side represents a gain of a proportional term and 'k2' in the third term on the right side represents a gain of an integral term.

$$Nm1^* = Ne^* \ddot{y}(1+\ddot{y})/\ddot{y} - Nm2/(Gr\ddot{y}\ddot{y})\ddot{y}\ddot{y}\ddot{y}\ddot{y}\ddot{y}\ddot{y}\ddot{y}\ddot{y} \qquad (1)$$

$$Tm1^* = \text{Previous } Tm1^* + k1(Nm1^* - Nm1) + k2(Nm1^* - Nm1)dt \qquad (2)$$

After calculation of the target revolution speed Nm1* and the torque command Tm1* of the motor MG1, the CPU 72 divides a difference between an output limit Wout of the battery 50 and a power consumption (generated power) of the motor MG1, which is the product of the calculated torque command Tm1* of the motor MG1 and the current revolution speed Nm1 of the motor MG1, by the current revolution speed Nm2 of the motor MG2 according to Equation (3) given below to calculate a torque limit Tmax as an upper limit torque output from the motor MG2 (step S180). The CPU 72 also calculates a tentative motor torque Tm2tmp as a torque to be output from the motor MG2 from the torque demand Tr*, the torque command Tm1*, and the gear ratio of the power distribution integration mechanism 30 according to Equation (4) given below (step S190), and sets the smallest among the calculated torque limit Tmax, the calculated tentative motor torque Tm2tmp, and the drive limit Tlim to a torque command Tm2* of the motor MG2 (step S200). In this cycle of the routine, there is no drive restriction of the motor MG2. The rated maximum torque of the motor MG2 at the revolution speed Ne has accordingly been set to the drive limit Tlim. Setting the torque command Tm2* of the motor MG2 in this manner enables the torque demand Tr*, which is to be output to the ring gear shaft 32a or the drive shaft, to be set as a restricted torque in the range of the output limit of the battery 50 and by the rated maximum torque of the motor MG2. Equation (4) is easily derived from the alignment chart of FIG. 5 discussed above.

$$T\max = (W\text{out} - Tm1^* \ddot{y}Nm1)/Nm2 \qquad (3)$$

$$Tm2tmp = (Tr^* + Tm1^*/\ddot{y})/Gr \qquad (4)$$

After setting the target revolution speed Ne* and the target torque Te* of the engine 22 and the torque commands Tm1* and Tm2* of the motors MG1 and MG2, the CPU 72 sends the target revolution speed Ne* and the target torque Te* of the engine 22 to the engine ECU 24 and the torque commands Tm1* and Tm2* of the motors MG1 and MG2 to the motor ECU 40 (step S210) and exits from this drive control routine. The engine ECU 24 receives the target revolution speed Ne* and the target torque Te* and carries out fuel injection control and ignition control of the engine 22 to drive the engine 22 at a drive point defined by the target revolution speed Ne* and the target torque Te*. The motor ECU 40 receives the torque commands Tm1* and Tm2* and carries out switching control of switching elements in the inverters 41 and 42 to drive the motor MG1 with the torque command Tm1* and to drive the motor MG2 with the torque command Tm2*.

Figure 6:
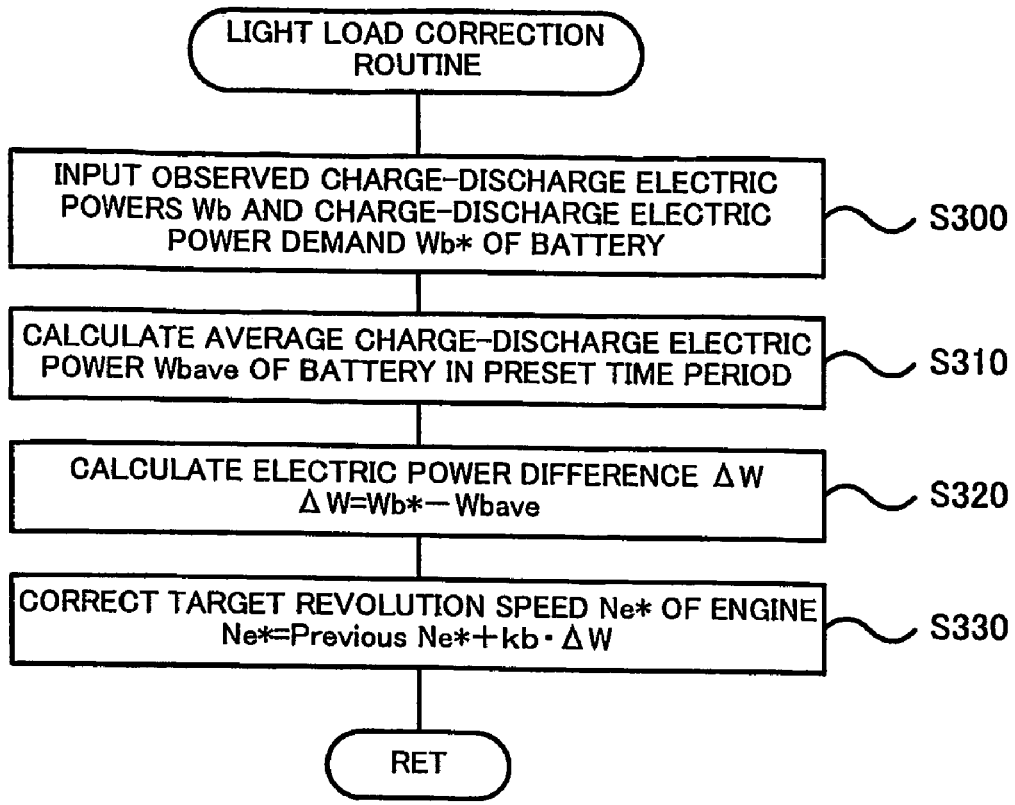
FIG. 6 is a flowchart showing a light load correction routine.

In the case with a drive restriction of the motor MG2, on the other hand, the routine gives an affirmative answer at step S130 and determines whether the input accelerator opening Acc is not greater than a preset reference opening Aref (step S140). The preset reference opening Aref is used to determine whether the driver requires a heavy load to the vehicle and is set equal to, for example, 30% or 40%. When the input accelerator opening Acc is not greater than the preset reference opening Aref, the CPU 72 specifies a light load state and executes a light load correction routine shown in the flowchart of FIG. 6 to correct a target drive point of the engine 22 defined by the target revolution speed Ne* and the target torque Te* (step S150). When the input accelerator opening Acc is greater than the preset reference opening Aref, on the contrary, the CPU 72 specifies a heavy load state and executes a heavy load correction routine shown in the flowchart of FIG. 7 to correct the target drive point of the engine 22 defined by the target revolution speed Ne* and the target torque Te* (step S160).

Figure 8:
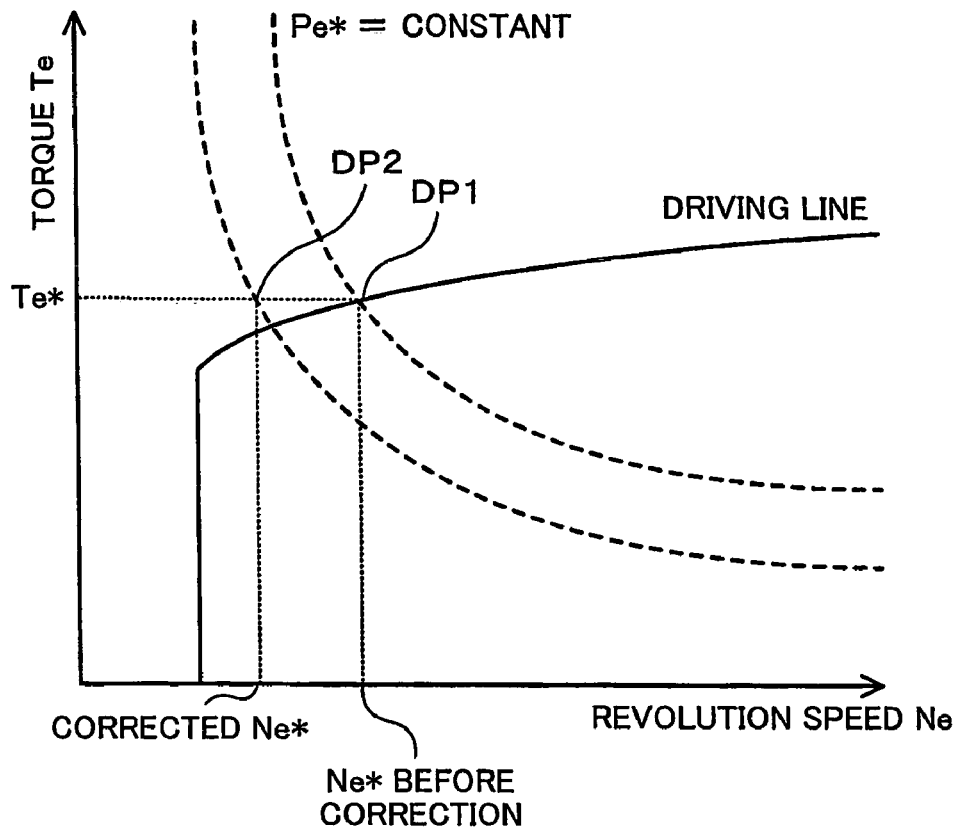
FIG. 8 shows a driving line of the engine 22 and a process of correcting a target drive point.
Figure 9:
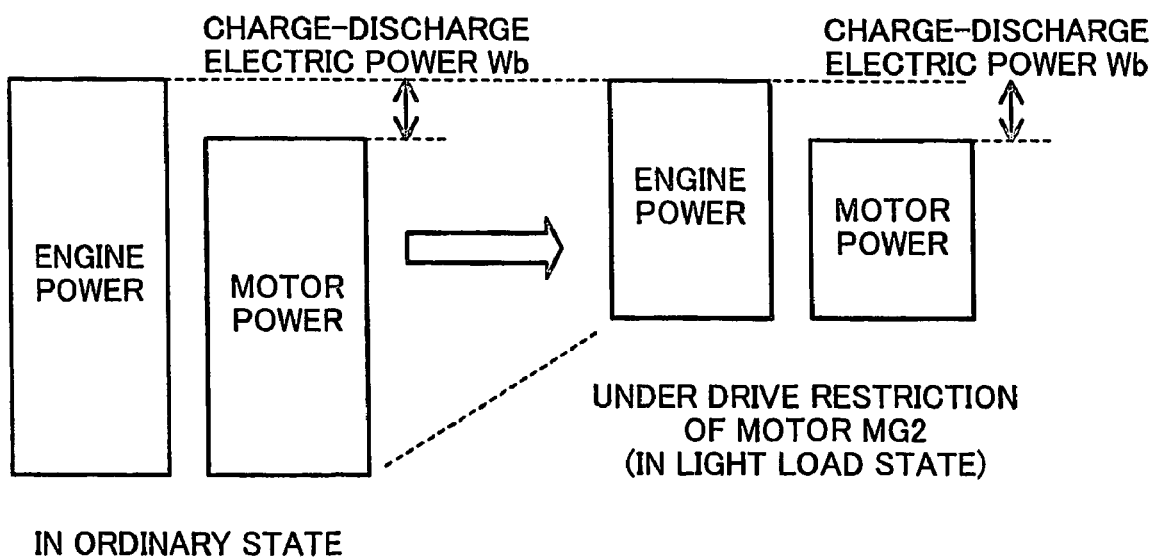
FIG. 9 shows the relation between power of the engine 22 and power of a motor MG2 in an ordinary state and under drive restriction of the motor MG2.

The light load correction routine first reads observed charge-discharge electric powers Wb and a charge-discharge electric power demand Wb* of the battery 50 (step S300) and calculates an average charge-discharge electric power Wbave of the observed charge-discharge electric powers Wb read in a preset time period (for example, in 1 second) (step S310). Here the observed charge-discharge electric power Wb of the battery 50 is obtained as the product of a voltage Vb between terminals of the battery 50 measured by a voltage sensor 51a and a charge-discharge current Ib measured by a current sensor 51b and is input from the battery ECU 52 via communication. The charge-discharge electric power demand Wb* is obtained by conversion of the charge-discharge power demand Pb*. The routine then calculates a difference (electric power difference) W between the charge-discharge electric power demand Wb* and the calculated average charge-discharge electric power Wbave (step S320) and corrects the target revolution speed Ne* of the engine 22 to cancel the electric power difference W (step S330). The procedure of this embodiment adds the product of the electric power difference W and a proportional gain kb to a previous value of the target revolution speed Ne* set in the previous cycle, so as to correct the target revolution speed Ne*. The light load correction routine varies the target revolution speed Ne* at the target drive point of the engine 22 to cancel the difference between the charge-discharge electric power demand Wb* and the calculated average charge-discharge electric power Wave, that is, to make the observed charge-discharge electric power Wb of the battery 50 equal to the charge-discharge electric power demand Wb*, while keeping the target torque Te* unchanged. FIG. 8 shows a driving line of the engine 22 and a process of correcting the target drive point of the engine 22. FIG. 9 shows the relation between the power of the engine 22 and the power of the motor MG2 in the ordinary state and under the drive restriction of the motor, MG2. As shown in FIG. 8, the target drive point of the engine 22 is changed from a drive point DP1, which is the intersection of a driving line of the engine 22 and a curve of constant power demand Pe*, to a drive point DP2 of a lower target revolution speed Ne*. The power output from the engine 22 is thus equal to the product of the corrected target revolution speed Ne* and the target torque Te* of the drive point DP2. The charge-discharge electric power Wb of the battery 50 under the drive restriction of the motor MG2 is thus equal to that in the ordinary state, as shown in FIG. 9.

Figure 7:
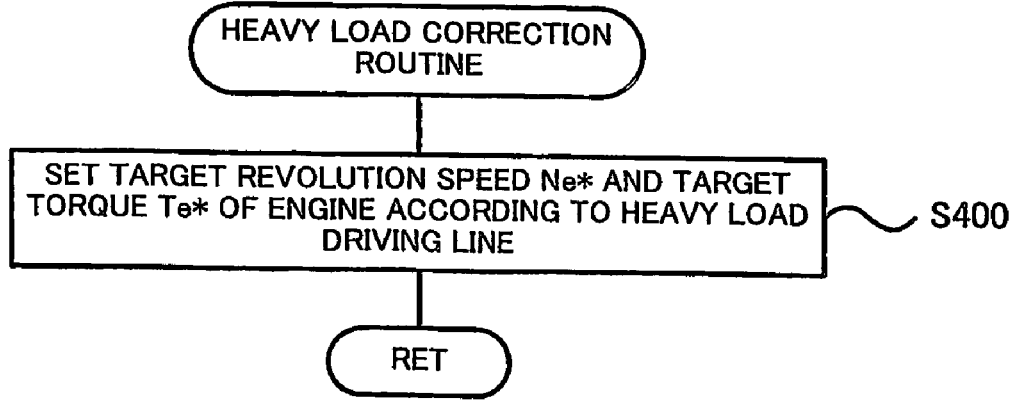
FIG. 7 is a flowchart showing a heavy load correction routine.
Figure 10:
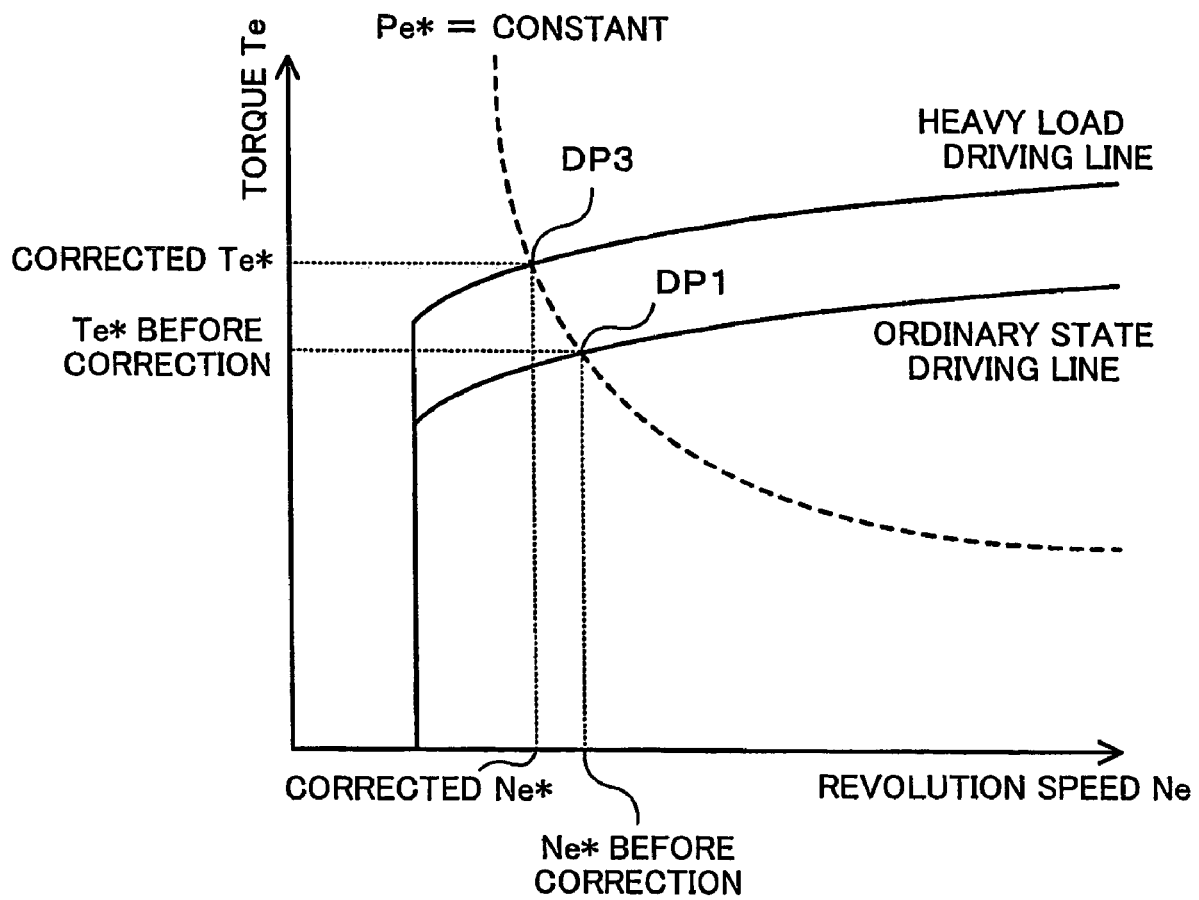
FIG. 10 shows a process of correcting the target drive point according to a heavy load driving line.

The heavy load correction routine sets the target revolution speed Ne* and the target torque Te* of the engine 22 as the intersection of a heavy load driving line and the curve of constant power demand Pe* (step S400 in FIG. 7). FIG. 10 shows a process of correcting the target drive point according to a heavy load driving line. As illustrated, the target drive point of the engine 22 is changed from a drive point DP1, which is the intersection of an ordinary state driving line and a curve of constant power demand Pe*, to a drive point DP3, which is the intersection of a heavy load driving line and the curve of constant power demand Pe*. Changing the target drive point to increase the target torque Te* in this manner enhances the torque (Te*/(1+)) transmitted to the ring gear shaft 32a among the torque to be output from the engine 22 (the target torque Te*). A torque that is still smaller than but is closer to the torque demand Tr* can thus be output to the ring gear shaft 32a or the drive shaft under the drive restriction of the motor MG2.

On completion of the correction of the target drive point of the engine 22, the routine executes the processing of steps S170 to S200 to set the torque commands Tm1* and Tm2* of the motors MG1 and MG2. In this cycle of the routine, there is a drive restriction of the motor MG2. The drive limit Tlim has thus been set as 60% or 50% of the rated maximum torque of the motor MG2 at the revolution speed Ne. The processing of step S200 sets the smallest among the torque limit Tmax, the tentative motor torque Tm2tmp, and the drive limit Tlim to the torque command Tm2* of the motor MG2. The torque command Tm2* of the motor MG2 is accordingly set by restricting the torque demand Tr* to be output to the ring gear shaft 32a or the drive shaft in the range of the output limit of the battery 50 and in the drive restriction of the motor MG2.

The target revolution speed Ne* and the target torque Te* of the engine 22 corrected as discussed above and the settings of the torque commands Tm1* and Tm2* of the motors MG1 and MG2 are respectively sent to the engine ECU 24 and the motor ECU 40 (step S210). The engine ECU 24 and the motor ECU 40 control the engine 22 and the motors MG1 and MG2 to ensure output of the torque command Tm1* from the motor MG1 and output of the torque command Tm2* from the motor MG2 and thereby to drive the engine 22 at the target drive point defined by the target revolution speed Ne* and the target torque Te*.

As described above, the hybrid vehicle 20 of the embodiment corrects the target drive point of the engine 22 to make the observed charge-discharge electric power Wb of the battery 50 equal to the charge-discharge electric power demand Wb*, while keeping the torque of the engine 22 unchanged, during a drive in the light load state and under the drive restriction of the motor MG2. This arrangement effectively prevents the battery 50 from being excessively charged and deterioration of the emission. During a drive in the heavy load state and under the drive restriction of the motor MG2, the hybrid vehicle 20 corrects the target drive point of the engine 22 to increase the target torque Te*. A torque that is still smaller than but is rather closer to the torque demand Tr* can thus be output to the ring gear shaft 32a or the drive shaft. This arrangement ensures output of a desired torque in response to the driver's manipulation even under the drive restriction of the motor MG2. In the absence of a drive restriction of the motor MG2, the torque demand Tr* is output to the ring gear shaft 32a or the drive shaft in the range of the output limit Wout of the battery 50 and in the range of the rated maximum torque.

The hybrid vehicle 20 of the embodiment effects the drive restriction of the motor MG2 when the temperature Tm of the motor MG2 or the temperature Tinv of the inverter 42 is not lower than the upper limit motor temperature or the upper limit inverter temperature. The drive restriction of the motor MG2 may be effected according to any suitable factor other than the temperature Tm of the motor MG2 or the temperature Tinv of the inverter 42.

In the hybrid vehicle 20 of the embodiment, the drive limit Tlim of the motor MG2 is set as 60% or 50% of the rated maximum torque of the motor MG2 at the revolution speed Nm2. The drive limit Tlim is not restricted to the value 60% or 50% but may be greater or smaller. The drive limit Tlim may be a variable that has a stricter restriction with an increase in temperature Tm of the motor MG2 or an increase in temperature Tinv of the inverter 42.

In the hybrid vehicle 20 of the embodiment, under the drive restriction of the motor MG2 and in the heavy load state, the target drive point of the engine 22 is changed to the drive point DP3, which is the intersection of the heavy load driving line and the curve of constant power demand Pe*. Another technique may alternatively be applied to set the target drive point.

Figure 11:
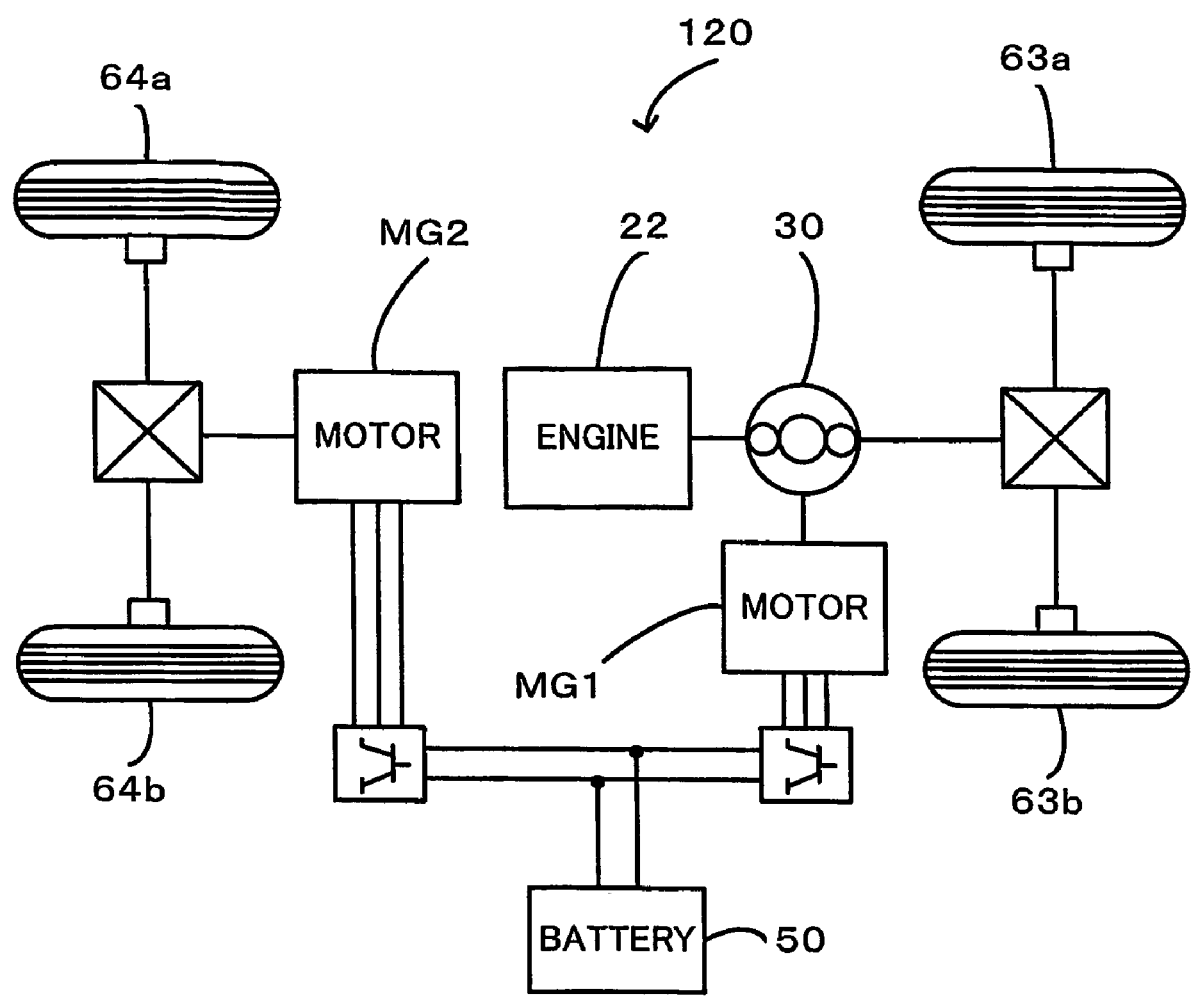
FIG. 11 schematically illustrates the construction of a hybrid vehicle 120 in one modified embodiment.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 11, the power of the motor MG2 may be output to another axle (that is, an axle linked with wheels 64a and 64b), which is different from an axle connected with the ring gear shaft 32a (that is, an axle linked with the wheels 63a and 63b).

Figure 12:
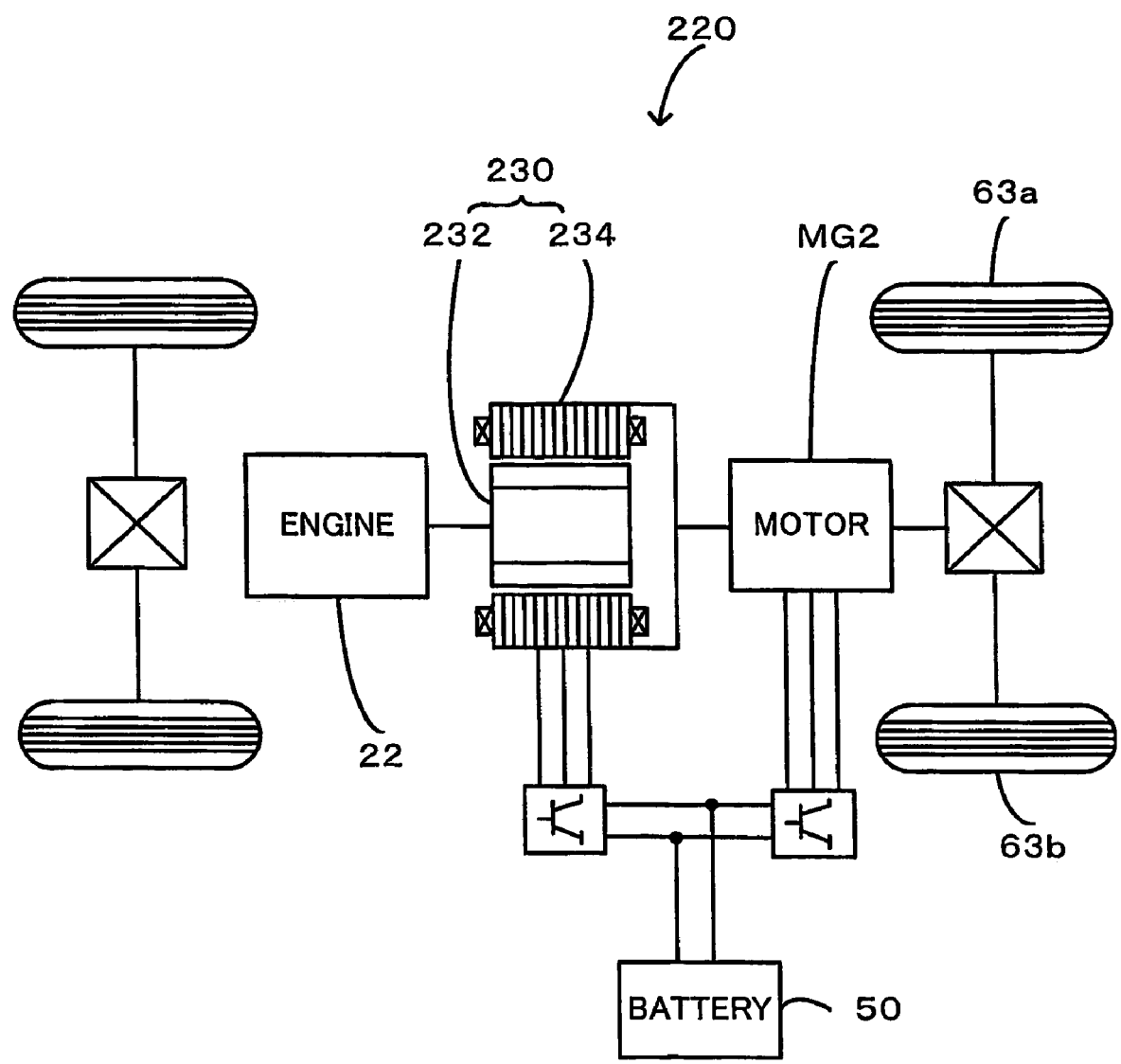
FIG. 12 schematically illustrates the construction of a hybrid vehicle 220 in another modified embodiment.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 12, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is applicable to the automobile industry and the drive system manufacturing industry.

The invention claimed is:

1. A power output apparatus that outputs power to a drive shaft, said power output apparatus comprising:
   an internal combustion engine;
   an electric power-mechanical power input-output module that is linked with an output shaft of said internal combustion engine and with said drive shaft and outputs at least part of power from said internal combustion engine to said drive shaft through inputs and outputs of electric power and mechanical power;
   a motor that is capable of inputting and outputting power from and to said drive shaft;
   an accumulator that is capable of supplying and receiving electric power to and from said electric power-mechanical power input-output module and said motor;
   an inverter coupled between the accumulator and the motor to transmit the electric power therebetween;
   a power demand setting module that sets a power demand required to said drive shaft, in response to an operator's manipulation;
   a target power setting module that sets a target power to be output from said internal combustion engine, based on the setting of the power demand;
   a drive restriction effectuation module that, when a predetermined restricting condition is fulfilled, effects a drive restriction of said motor based on the predetermined restricting condition;

a correction module that corrects the setting of the target power based on the effected drive restriction, when the drive restriction of said motor is effected by said drive restriction effectuation module; and a control module that executes normal control of controlling said internal combustion engine, said electric power-mechanical power input-output module, and said motor in the case of no effectuation of the drive restriction of said motor by said drive restriction effectuation module to ensure output of the target power from said internal combustion engine and output of a power corresponding to the setting of the power demand to said drive shaft, said control module executing restriction control of controlling said internal combustion engine, said electric power-mechanical power input-output module, and said motor in the case of effectuation of the drive restriction of said motor by said drive restriction effectuation module to ensure output of the corrected target power from said internal combustion engine and output of a power in a range of the effected drive restriction from said motor;

wherein the predetermined restricting condition is fulfilled when a temperature of said motor is not less than an upper limit motor temperature set to ensure continuous actuation of said motor or when a temperature of the inverter which drives said motor is not less than an upper limit inverter temperature set to ensure continuous actuation of said motor, wherein, when executing the restriction control during a predetermined light load state, said control module changes a charge-discharge electric power of said accumulator, used to charge said accumulator or obtained by discharging said accumulator, while maintaining a constant engine torque, and wherein, when executing the restriction control during a predetermined heavy load state, said control module changes the charge-discharge electric power of said accumulator while maintaining a constant power demand of said engine.

2. A power output apparatus in accordance with claim 1, said power output apparatus further comprising:

a charge-discharge electric power measurement module that measures a charge-discharge electric power used to charge said accumulator or obtained by discharging said accumulator; and an electric power demand setting module that sets an electric power demand for charging or discharging said accumulator, based on a predetermined charge-discharge condition, wherein said correction module corrects the setting of the target power to cancel a difference between the charge-discharge electric power measured by said charge-discharge electric power measurement module and the electric power demand set by said electric power demand setting module.

3. A power output apparatus in accordance with claim 1, wherein said target power setting module specifies a target torque and a target revolution speed to set the target power, and said correction module varies the specified target revolution speed to correct the target power.

4. A power output apparatus in accordance with claim 1, wherein said electric power-mechanical power input-output module comprises:

a three-shaft power input-output assembly that is connected with three shafts, that is, said output shaft of said internal combustion engine, said drive shaft, and a third shaft, and specifies input and output of power from and to one residual shaft among said three shafts, based on powers input and output from and to two shafts among said three shafts; and a generator that inputs and outputs power from and to said third shaft.

5. A power output apparatus in accordance with claim 1, wherein said electric power-mechanical power input-output module comprises a pair-rotor generator having a first rotor, which is linked with the output shaft of said internal combustion engine, and a second rotor, which is linked with said drive shaft and rotates relative to the first rotor, said pair-rotor generator outputting at least part of the power from said internal combustion engine to said drive shaft through input and output of electric power by electromagnetic interaction between the first rotor and the second rotor.

6. A power output apparatus that outputs power to a drive shaft, said power output apparatus comprising:

an internal combustion engine;

an electric power-mechanical power input-output module that is linked with an output shaft of said internal combustion engine and with said drive shaft and outputs at least part of power from said internal combustion engine to said drive shaft through inputs and outputs of electric power and mechanical power;

a motor that is capable of inputting and outputting power from and to said drive shaft;

an accumulator that is capable of supplying and receiving electric power to and from said electric power-mechanical power input-output module and said motor;

an inverter coupled between the accumulator and the motor to transmit the electric power therebetween; and a control module that sets a power demand required to said drive shaft in response to an operator's manipulation and sets a target power to be output from said internal combustion engine based on the setting of the power demand, said control module controlling said internal combustion engine, said electric power-mechanical power input-output module, and said motor in the case of no fulfillment of a predetermined restricting condition to ensure output of the target power from said internal combustion engine and output of a power corresponding to the power demand to said drive shaft, in the case of fulfillment of the predetermined restricting condition, said control module effecting a drive restriction of said motor based on the predetermined restricting condition, correcting the setting of the target power based on the effected drive restriction, and controlling said internal combustion engine, said electric power-mechanical power input-output module, and said motor to ensure output of the corrected target power from said internal combustion engine and output of a power in a range of the effected drive restriction from said motor;

wherein the predetermined restricting condition is fulfilled when a temperature of said motor is not less than an upper limit motor temperature set to ensure continuous actuation of said motor or when a temperature of the inverter which drives said motor is not less than an upper limit inverter temperature set to ensure continuous actuation of said motor, wherein, when executing the restriction control during a predetermined light load state, said control module changes a charge-discharge electric power of said accumulator, used to charge said accumulator or obtained by discharging said accumulator, while maintaining a constant engine torque, and wherein, when executing the restriction control during a predetermined heavy load state, said control module changes the charge-discharge electric power of said accumulator while maintaining a constant power demand of said engine.

7. A control method for a power output apparatus, which comprises: an internal combustion engine; an electric power-mechanical power input-output module that is linked with an output shaft of said internal combustion engine and with a drive shaft and outputs at least part of power from said internal combustion engine to said drive shaft through inputs and outputs of electric power and mechanical power; a motor that is capable of inputting and outputting power to and from said drive shaft; an accumulator that is capable of supplying and receiving electric power to and from said electric power-mechanical power input-output module and said motor, and an inverter coupled between the accumulator and the motor to transmit the electric power therebetween, said control method comprising the steps of:
- (a) setting a power demand required to said drive shaft, in response to an operator's manipulation;
- (b) setting a target power to be output from said internal combustion engine, based on the setting of the power demand;
- (c) when a predetermined restricting condition is fulfilled, effecting a drive restriction of said motor based on the predetermined restricting condition;
- (d) correcting the setting of the target power based on the effected drive restriction, in the case of effectuation of the drive restriction of said motor; and
- (e) controlling said internal combustion engine, said electric power-mechanical power input-output module, and said motor in the case of no effectuation of the drive restriction of said motor to ensure output of the target power from said internal combustion engine and output of a power corresponding to the setting of the power demand to said drive shaft, while controlling said internal combustion engine, said electric power-mechanical power input-output module, and said motor in the case of effectuation of the drive restriction of said motor to ensure output of the corrected target power from said internal combustion engine and output of a power in a range of the effected drive restriction from said motor;

wherein the predetermined restricting condition is fulfilled when a temperature of said motor is not less than an upper limit motor temperature set to ensure continuous actuation of said motor or when a temperature of the inverter which drives said motor is not less than an upper limit inverter temperature set to ensure continuous actuation of said motor, wherein, when executing the restriction control during a predetermined light load state, a charge-discharge electric power of said accumulator, used to charge said accumulator or obtained by discharging said accumulator, is changed while maintaining a constant engine torque, and wherein, when executing the restriction control during a predetermined heavy load state, the charge-discharge electric power is changed while maintaining a constant power demand of said engine.

8. A control method in accordance with claim 7, said control method further comprising, prior to said step (d), the steps of:
- (f) measuring the charge-discharge electric power used to charge said accumulator or obtained by discharging said accumulator; and
- (g) setting an electric power demand for charging or discharging said accumulator, based on a predetermined charge-discharge condition, wherein said step (d) corrects the target power to cancel a difference between the observed charge-discharge electric power and the setting of the electric power demand.

* * * * *

UNITED STATES PATENT AND TRADEMARK OFFICE
CERTIFICATE OF CORRECTION

| | |
|---|---|
| PATENT NO. | : 7,832,510 B2 |
| APPLICATION NO. | : 10/563136 |
| DATED | : November 16, 2010 |
| INVENTOR(S) | : Takeshi Hoshiba et al. |

It is certified that error appears in the above-identified patent and that said Letters Patent is hereby corrected as shown below:

In the Cover Page, Col. 2, Abstract:

Line 2: Change "rankshaft" to --crankshaft--.

| Column | Line | |
|---|---|---|
| 1 | 3 | After the title, insert: --This is a 371 national phase application of PCT/JP2004/008694 filed 15 June 2004, claiming priority to Japanese Patent Application No. 2003-200030 filed 22 July 2003, the contents of which are incorporated herein by reference.--. |
| 10 | 43 | After "gear ratio" insert --$\rho$--. |
| 11 | 8 | Change Equation (1) to read as follows: $$\text{--}Nm1^* = Ne^* (1+\rho)/\rho - Nm2/(Gr \cdot \rho) \qquad (1)\text{--}.$$ |
| 11 | 10-11 | Change Equation (2) to read as follows: $$\text{--}Tm^* = \text{Previous } Tm1^* + k1(Nm1^* - Nm1) + k2\int(Nm1^* - Nm1)dt \qquad (2)\text{--}.$$ |
| 11 | 24 | After "gear ratio" insert --$\rho$--. |
| 12 | 26 | Change "difference) W" to --difference) $\Delta$W--. |
| 12 | 30 | Change "difference W" to --difference $\Delta$W--. |
| 12 | 32 | Change "ference W" to --ference $\Delta$W--. |
| 12 | 39 | Change "Wave" to --Wbave--. |
| 13 | 2 | Change "torque (Te*/(1+))" to --torque (Te*/(1+ $\rho$))--. |

Signed and Sealed this
Twenty-first Day of February, 2012

David J. Kappos
*Director of the United States Patent and Trademark Office*

CERTIFICATE OF CORRECTION (continued)
U.S. Pat. No. 7,832,510 B2

| Column | Line | |
|---|---|---|
| 15 | 40 | Change "A power output" to --The power output--. |
| 15 | 56 | Change "A power output" to --The power output--. |
| 15 | 62 | Change "A power output" to --The power output--. |
| 16 | 7 | Change "A power output" to --The power output--. |
| 18 | 24 | Change "A power output" to --The power output--. |